United States Patent [19] [11] 4,421,889
Braun et al. [45] Dec. 20, 1983

[54] AQUEOUS DISPERSION PAINTS AND PROCESS FOR MAKING THE SAME

[75] Inventors: Helmut Braun, Hofheim; Helmut Rinno, Lorsbach; Werner Stelzel, Bad Soden am Taunus, all of Fed. Rep. of Germany

[73] Assignee: Hoechst Aktiengesellschaft, Frankfurt am Main, Fed. Rep. of Germany

[21] Appl. No.: 493,803

[22] Filed: May 13, 1983

Related U.S. Application Data

[63] Continuation-in-part of Ser. No. 233,823, Feb. 12, 1981, abandoned, which is a continuation of Ser. No. 819,272, Jul. 27, 1979, abandoned, which is a continuation of Ser. No. 712,363, Aug. 6, 1976, abandoned, Ser. No. 712,364, Aug. 6, 1976, abandoned, Ser. No. 712,365, Aug. 6, 1976, abandoned.

[30] Foreign Application Priority Data

Aug. 8, 1975 [DE] Fed. Rep. of Germany ....... 2535372
Aug. 8, 1975 [DE] Fed. Rep. of Germany ....... 2535373
Aug. 8, 1975 [DE] Fed. Rep. of Germany ....... 2535374

[51] Int. Cl.³ ................ C08L 35/02; C09D 3/74

[52] U.S. Cl. .................. 524/381; 524/357; 524/388; 524/552; 524/559; 524/560; 524/561; 524/564

[58] Field of Search ............ 524/381, 388, 552, 559, 524/560, 561, 564, 357

[56] References Cited

U.S. PATENT DOCUMENTS 3,455,887 7/1969 Levine ................... 524/561 X
3,607,834 9/1971 Marx et al. ............... 524/357

FOREIGN PATENT DOCUMENTS 1185216 3/1970 United Kingdom .

Primary Examiner—Howard E. Schain
Attorney, Agent, or Firm—Curtis, Morris & Safford

[57] ABSTRACT

Dispersion paints with high wet adhesion are obtained if, as the binder thereof, an aqueous plastics dispersion is used, the polymer content of which includes monomeric units of an acetoacetic acid ester of an unsaturated alcohol, especially vinyl or allyl alcohol or a diester of a dihydroxy compound in which one acyl radical is acetoacetyl and the other acyl radical is an acrylic or methacrylic radical. The preparation of paints with a low pigment content is especially facilitated by the use of such a dispersion.

16 Claims, No Drawings

AQUEOUS DISPERSION PAINTS AND PROCESS FOR MAKING THE SAME

This application is a continuation-in-part, of application Ser. No. 233,823, filed Feb. 12, 1981, which is a continuation of Ser. No. 819,272 filed July 27, 1979 which is a continuation of Ser. Nos. 712,363; 712,364 and 712,365, all filed Aug. 6, 1976, all now abandoned.

This application relates to dispersion paints having improved wet adhesion.

The problem of the wet adhesion of dispersion paints, i.e., the adhesion of the dried paint to smooth non-absorbent surfaces after the dried paint has been re-wetted, has limited for a long time the use of such dispersion paints. Dispersion paints having a low pigment content, which dry on the substrate with formation of a glossy or slightly dull film, have a poor adhesion to smooth non-absorbent surfaces when the paints are re-wetted after drying. The wet adhesion is especially unsatisfactory with fresh paints which have not yet undergone ageing.

Dispersion paints of low pigment content are chosen when a washable coat of paint is desired. Owing to the high binder content of the paint a non-permeable washable film is formed. Dispersion paints drying with formation of a glossy or slightly dull film have a concentration by volume of pigment of less than 40%, the concentration generally being in the range of about 10 to 25%. They also contain about 3 to 20% of organic solvent to improve the gloss and flow, to prolong the working time and for film consolidation, for example, polyhydric alcohols miscible with water and having up to 6 carbon atoms, especially ethylene and propylene glycol, or the monomethyl to monobutyl ethers thereof. To improve the film consolidation solvents having a restricted solubility in water are used, such as the monoglycol ethers of carboxylic acids and more particularly esters of carboxylic acids with monoalkyl ethers of glycols or oligoglycols. Butyl diglycol acetate is one of the most widely used representatives of this group. The combination of a low pigment content with a relatively high solvent content has a very detrimental effect on the wet adhesion of coatings of dispersion paints.

Paints having poor wet adhesion do not produce washable coatings when applied to smooth non-absorbent surfaces, for example, old coats of alkyd or oil paint. In moist rooms, such as kitchens, bath rooms, or industrial locations where water of condensation may form, the new coating may become detached from the substrate if the wet adhesion of the paint is insufficient. Moreover, a poor wet adhesion complicates painting. When, for example, the base and the upper half of a wall or the wall and the ceiling are to be painted in different colors, the first coat of paint may be soiled by application of the second and different paint as a result of inaccurate handling of the brush. In principle, the second paint can be wiped off with a wet cloth or sponge, but with a poor wet adhesion the first paint may then be damaged or even removed as the second paint is applied.

Therefore, many attempts have been made to modify plastics dispersions in such a manner that the dispersion paints made therewith have the desired wet adhesion. In German Offenlegungsschrift No. 1,595,501 it has been proposed to prepare plastics dispersions by polymerizing suitable monomers in aqueous emulsion using as comonomers 0.2 to 15% by weight, calculated on the total amount of the monomers, of compounds carrying oxirane groups and then to react the copolymer at room temperature with ammonia or an amine. Suitable oxirane compounds are above all, glycidyl esters of acrylic or methacrylic acid and allyl glycidyl ethers or vinyl glycidyl ethers. Dispersion paints prepared with plastics dispersions of this type have quite a good wet adhesion but for many applications the wet adhesion is not sufficient.

It has also been proposed to use monomers containing special functional groups (for example, certain cycloureides, oxazolidines, azomethines or aziridines) as comonomers for the emulsion polymerization in order to improve the wet adhesion of dispersion paints on non-absorbent substrates. Thus it has been proposed to incorporate amino groups into the polymer chains of emulsion polymers in such a manner that comonomers having special reactive groups, for example, oxirane groups or groups having nucleophilically substitutable halogen atoms are additionally used in the emulsion polymerization and the amino groups are introduced into the polymer system only after complete polymerization by reaction with ammonia or amines.

Dispersion paints containing such amino group bearing polymers as binder, however, often have a tendency to become yellow. Moreover, the wet adhesion is only very slightly improved. Many of these paints, at low pigment content, yield coatings having a sufficient adhesion on smooth, non-absorbent substrates, but if organic solvents are added to these paints, the coatings obtained therefrom have no wet adhesion whatsoever.

In German Offenlegungsschrift No. 1,495,706, plastics dispersions are described the polymer portion of which contains monomers having keto groups, through which cross-linking with, for example, dicarboxylic acid-bis-hydrazides can be obtained.

These dispersions are used, for example, in textile finishing for the manufacture of sizing agents resistant to dry-cleaning, or in the paint industry for the manufacture of solvent resistant paints.

It has now been found that solvent-containing paints having a low pigment content and a high degree of wet adhesion are obtained when plastics dispersions are used as binder which are prepared by copolymerization in an aqueous medium of olefinically unsaturated monomers and a polymerizable acetoacetic acid ester as comonomer. The paints obtained are characterized by a low monomer content which is advantageous since it indicates a high degree of polymerization in the finished product. Acetoacetic acid esters that may be used in accordance with this invention are, for example, acetoacetic acid vinyl or allyl esters or diesters of the formula

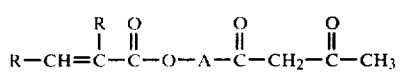

wherein R is H or $CH_3$ and A is $(CH_2)_n-O-$ or $(CH_2-CH_2)_m-O-$; n being an integer of from 1 to 4 and m an integer of from 1 to 3.

Suitable monomers of this type include, for example, acetoacetic acid vinyl ester, acetoacetic acid allyl ester or acetoacetic acid esters of $\beta$-hydroxyethyl acrylate or methacrylate or hydroxypropylacrylate or methacrylate. Acetoacetic acid allyl esters are preferred. Relative to the total weight of all monomers, the amount of acetoacetic acid ester is desirably from 0.5 to 10% by weight, preferably from 1 to 5% by weight.

Instead of a single dispersion, mixtures of different dispersions may be used; however, at least one of them must contain the polymerically bound acetoacetic acid ester units in an amount which ensures that, relative to the total weight of all monomeric units, the acetoacetic acid ester units are present to the extent referred to above.

By dispersion paints having a low pigment content in accordance with this invention there are to be understood dispersion paints the pigment volume concentration of which is below 40%, e.g., from 7 to 30%, preferably from 10 to 20%.

Gloss-improving organic solvents useful in accordance with this invention are glycols and the derivatives thereof, for example, ethyleneglycol, propyleneglycol, butyleneglycol, hexyleneglycol, oligoglycols such as di- or triglycol, glycol or oligoglycol ethers such as methyl, ethyl, propyl or butyl, mono-, di- or triglycol ethers, mono-, di- or triglycol esters such as mono-, di- or triglycol acetate, propionate or butyrate, or (oligo)glycol semiethers/semiesters, for example, methyl, ethyl, propyl or butyl mono-, di- or triglycol acetate, propionate or butyrate. Also mixtures of these substances can be used as organic solvents according to this invention. The organic solvents are added to the paint in an amount of from 3 to 20% by weight, preferably from 5 to 15% by weight, relative to the total weight of the paint.

The aqueous plastics dispersions have a solids content of from 20 to 70%, preferably from 40 to 60%. For the rest, the aqueous plastics dispersions are manufactured in usual manner according to the processes known to those skilled in the art.

The selection of the monomers other than the acetoacetic acid ester is not critical. All monomers generally used for making plastics dispersions, which can be combined in accordance with the requirements of practice, are suitable. Useful monomers include, for example, vinyl esters of organic carboxylic acids and the acid moiety of which contains 1 to 30, preferably 1 to 20 carbon atoms, for example, vinyl acetate, vinyl propionate, vinyl butyrate, vinyl isobutyrate, isononanoic acid vinyl ester and vinyl esters of branched monocarboxylic acids having up to 20 carbon atoms, e.g., pivalic acid vinyl ester and versatic acid vinyl ester as described, for example, in British Pat. No. 993,470; esters of acrylic acid or methacrylic acid having from 1 to 30 and preferably 1 to 20 carbon atoms in the alcohol moiety, for example, ethyl acrylate, isopropyle acrylate, butyl acrylate, 2-ethylhexyl acrylate, methylmethacrylate, butylmethacrylate; aromatic or aliphatic $\alpha,\beta$-unsaturated hydrocarbons such as ethylene, propylene, styrene, vinyltoluene or butadiene, isoprene or chloroprene; vinyl halides such as vinyl chloride; unsaturated nitriles such as acrylonitrile; diesters of maleic acid or fumaric acid, for example, dibutyl maleate or dibutyl fumarate; $\alpha,\beta$-unsaturated carboxylic acids such as acrylic, methacrylic, crotonic, maleic or fumaric acids and derivatives thereof, for example, acrylamide or methacrylamide.

When selecting the appropriate monomers or monomer combinations the generally known conditions for the manufacture of dispersion paints should be kept in mind. In the first place, care should be taken that polymers are formed which yield a coherent film under the normal drying conditions for a coat of paint, and the monomers for making the copolymers should be selected in such a manner that, depending on the respective polymerization parameters, the formation of copolymers with the halogen compounds, if present, will occur. Some suitable monomer combinations are listed below:

ethyl acrylate/methylmethacrylate/(meth)acrylic acid/acetoacetic acid allyl ester, butyl acrylate/methylmethacrylate/(meth)acrylic acid/acetoacetic acid allyl ester, isobutyl acrylate/methylmethacrylate/(meth)acrylic acid/acetoacetic acid allyl ester, 2-ethylhexyl acrylate/methylmethacrylate/(meth)acrylic acid/acetoacetic acid allyl ester, ethyl acrylate/styrene/methylmethacrylate/(Meth)acrylic acid/acetoacetic acid allyl ester, butyl acrylate/styrene/methylmethacrylate/(meth)acrylic acid/acetoacetic acid allyl ester, 2-ethylhexyl acrylate/styrene/(meth)acrylic acid/acetoacetic acid allyl ester, vinyl acetate/butyl acrylate/acetoacetic acid allyl ester, vinyl acetate/dibutyl maleate/acetoacetic acid allyl ester, vinyl acetate/dibutyl fumarate/acetoacetic acid allyl ester, vinyl acetate/isononanoic acid vinyl ester/acetoacetic acid allyl ester, vinyl acetate/2-ethylhexanoic acid vinyl ester/acetoacetic acid allyl ester, vinyl acetate/vinyl ester of versatic acid with 10 carbon atoms/acetoacetic acid allyl ester, vinyl acetate/ethylene/acetoacetic acid allyl ester, vinyl acetate/ethylene/vinyl chloride/acetoacetic acid allyl ester Suitable aqueous polymer dispersions for use in making dispersion paints according to the present invention are obtainable by copolymerizing (I) a blend of a monomer having a hardening effect and a monomer having a plasticizing effect or (II) a blend of vinyl esters in which the acid of one of the esters has a carboxyl group directly linked to a tertiary or quaternary carbon atom.

Dispersions of Type (I) may be prepared, for example, by copolymerizing:

(A) from 20 to 80% by weight, preferably 40 to 60% by weight, of monomers that have a hardening effect on the polymer and that are copolymerizable with acrylic acid esters or conjugated dienes having from 4 to 8 carbon atoms, optionally substituted by halogen, as listed below, (B) from 20 to 80% by weight, preferably 40 to 60% by weight, of monomers that are esters of acrylic acid or conjugated dienes having from 4 to 8 carbon atoms optionally substituted by halogen and having a plasticizing effect on the polymer, (C) from 0.1 to 5% by weight, preferably 1 to 3% by weight, of a water-soluble monomer that is either acrylic acid or methacrylic acid or acrylamide or methacrylamide and, (D) from 0.5 to 10% by weight, preferably 1 to 5% by weight, of an acetoacetic acid ester of the formula

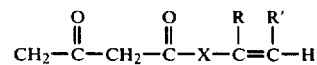

wherein X is —O—, —O—CH$_2$— or

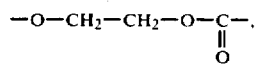

R is H or CH₃ and R' is H or CH₃.

Hardening monomers of the kind referred to in (A) above are, for example, methylmethacrylate, styrene or vinyltoluene.

Plasticizing monomers of the kind referred to in (B) above are, for example, ethyl acrylate, isopropyl acrylate, butyl acrylate, isobutyl acrylate, 2-ethylhexyl acrylate or butadiene, isoprene or chloroprene.

Dispersions of Type (II) may be obtained, for example, by copolymerizing:
- (A') from 5 to 50% by weight, preferably from 15 to 35% by weight, of vinyl esters of saturated monocarboxylic acids the carboxyl group of which is directly linked to a tertiary or quaternary carbon atom and the carboxylic acid radical of which contains from 5 to 20, preferably from 5 to 11, carbon atoms in the molecule,
- (B') from 40 to 94.5% by weight of vinyl esters of saturated carboxylic acids having from 2 to 4 carbon atoms,
- (C') optionally from 0 to 30% by weight of other α,β-unsaturated compounds copolymerizable with the above monomers and,
- (D') from 0.5 to 10% by weight, preferably from 1 to 5% by weight, of an acetoacetic acid ester of the formula

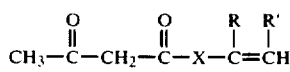

wherein X is —O—, —O—CH₂ or

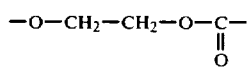

and R and R' each are H or CH₃.

Compounds of the kind described in D' above are, for example, acetoacetic acid vinyl or allyl ester, or acetoacetic acid esters of β-hydroxy-ethylacrylate or methacrylate or crotonate, Examples of olefinically unsaturated monomers falling within the definitions of (A'), (B') and (C') have been listed above.

Plastics dispersions are extremely complicated systems, and the manufacture of dispersions according to the present invention requires the application of prior knowledge and experience existing in the field of emulsion polymerization, including that not particularly described in this specification. Failure to follow the rules known to those skilled in the art of emulsion polymerization may adversely affect important properties, i.e., water resistance, of the dispersion films or paint films. Thus, for example, the dispersions should not contain substantially in excess of the usual amounts of up to 3%, preferably up to 2%, if ionic emulsifiers, or of up to 6%, preferably up to 4%, of non-ionic emulsifiers, relative to the polymer content.

Suitable non-ionic emulsifiers are, for example, alkyl polyglycol ethers such as the ethoxylation products of lauryl, oleyl or stearyl alcohol or of mixtures such as coconut fatty alcohol; alkyl-phenol polyglycol ethers such as the ethoxylation products of octyl- or nonyl-phenol, diisopropyl-phenol, triisopropyl-phenol or di- or tri-tert.butyl-phenol; or ethoxylation products of polypropylene oxide.

As ionic emulsifiers anionic emulsifiers are used, in the first place, for example, alkali metal or ammonium salts of alkyl, aryl or alkylaryl sulfonates, sulfates, phosphates, phosphonates, or compounds having different anionic end groups, with oligo- or polyethylene oxide units possibly being interposed between the hydrocarbon radical and the anionic group. Typical compounds are sodium lauryl sulfate, sodium octyl-phenol glycol ether sulfate, sodium dodecyl-benzene sulfonate, sodium lauryl diglycol sulfate, ammonium tri-tert. butyl-phenol penta- or octa-glycol sulfate.

As protective colloids there may be used natural substances such as gum arabic, starch, alginates, or modified natural substances such as methyl, ethyl, hydroxyalkyl, or carboxymethyl cellulose, or synthetic substances, for example, polyvinyl alcohol, polyvinyl pyrrolidone, or mixtures of the aforesaid substances. Modified cellulose derivatives and synthetic protective colloids are preferred.

These protective colloids can be employed only to a limited degree if the described monomer systems are used, as is known to those skilled in the art. The quantities used are frequently low, namely, in the range from 0.001 to 1% and the tolerance and the kind of addition must be examined in each case. When the use of protective colloids is required, the principles, for example, disclosed in German Auslegeschrift No. 1,570,312 may be applied.

To initiate and continue polymerization, oil-soluble and/or preferably water-soluble radical forming agents or redox systems are used, for example, hydrogen peroxide, potassium or ammonium peroxydisulfate, dibenzoyl peroxide, lauryl peroxide, tri-tert.butyl peroxide, bisazodiisobutyronitrile, either per se or together with reducing components, for example, sodium bisulfite, Rongalite ®, glucose, ascorbic acid, and other compounds having a reducing action.

To prepare the dispersion paints having a high wet adhesion the dispersion are blended with a pigment suspension. Pigment suspensions or pigment pastes of this type, which are suitable for making dispersion paints of low pigment content and especially gloss paints consist, for example, of titanium dioxide uniformly dispersed in water. They contain, in general, protective colloids such as cellulose derivatives, for example, hydroxyethyl cellulose, and dispersing agents, for example, salts of poly(meth)acrylic acid or sodium polyphosphate. Usual constituents of pigment suspensions are furthermore antimicrobic preserving agents, anti-foaming agents, pH stabilizers and fillers. Especially suitable titanium dioxide pigments are the rutile and anatase modifications. For the manufacture of gloss paints the average particle diameter of the pigment should be near the lower limit of the light wave length, i.e. at about 0.4 to 0.2 micron. For making dull paints of low pigment content special large surface silicate pigments can be concomitantly used. Dull paints of high binder content yield paint coatings that are easy to clean. The pigment paste may, of course, also contain colored pigments or the desired shade can be obtained by adding a coloring dyestuff to the dispersion paint containing the white pigment.

The pigment suspension can be prepared in known manner, for example, by dispersing the pigment in a dissolver, a ball mill, sand mill or roll mill. For use in gloss paints the pigment suspension should not contain noticeable amounts of pigment aggregates which would affect the gloss.

Auxiliaries such as plasticizers, cross-linking agents, buffer substances, thickening agents, thixotropic agents, rust preventing agents, alkyd resins, or drying oils may be added to the dispersion or the finished dispersion paint. Suitable plasticizers are not the solvents initially mentioned as film consolidation agents having a temporary action only but compounds which reduce the film-forming temperature and remain the polymer for a longer period of time, for example, dibutyl phthalate.

The following Examples illustrate the invention:

EXAMPLE 1

A monomer emulsion was initially prepared having the following composition:
- 310 parts by weight water,
- 6 parts by weight sodium salt of lauryl alcohol diglycol ether sulfate,
- 12 parts by weight methacrylic acid,
- 6 parts by weight acrylic acid,
- 300 parts by weight butyl acrylate,
- 300 parts by weight styrene and
- 12 parts by weight acetoacetic acid allyl ester.

The components were stirred in a rapid stirrer until a stable emulsion was obtained.

A mixture consisting of
- 303 parts by weight water,
- 3 parts by weight sodium salt of lauryl alcohol diglycol ether sulfate and,
- 60 parts by weight of the monomer emulsion, was heated in a 2-liter three-necked flask placed in a heating bath and equipped with a stirrer, a reflux condenser, a dropping funnel and a thermometer and a solution of 0.45 parts by weight ammonium peroxydisulfate in 15 parts by weight water was added. Thereafter the residual monomer emulsion was added and polymerization was carried to completion. The total time of addition was 2 hours, the polymerization temperature and the temperature during the second heating period were in the range from 81° to 83° C. When the monomer addition was finished 0.15 parts by weight ammonium peroxydisulfate in 5 parts by weight water were added, heating was continued for 60 minutes and the reaction mixture was cooled.

The pH was adjusted to 9.5 by means of 15 ml of 25% NH$_3$; the solids content was about 50%.

EXAMPLE 2

The procedure of Example 1 was followed except that acetoacetic acid allyl ester was omitted in the polymerization.

EXAMPLE 3

A monomer emulsion was prepared from:
- 310 parts by weight water,
- 9 parts by weight ammonium-tri-tertiary butyl phenol polyglycol ether sulfate having about 8 ethylene oxide units,
- 12 parts by weight of methacrylic acid,
- 6 parts by weight acrylic and,
- 300 parts by weight 2-ethylhexyl acrylate,
- 300 parts by weight methyl methacrylate and,
- 18 parts by weight acetoacetic acid allyl ester, by stirring in a rapid stirrer, until a stable emulsion was obtained.

In an apparatus as described in Example 1 a mixture consisting of:
- 306 parts by weight water,
- 3 parts by weight ammonium-tri-tertiary butyl phenol polyglycol ether sulfate having about 8 ethylene oxide units and,
- 60 parts by weight monomer emulsion, was heated to 81° C. and a solution of 0.45 parts by weight ammonium peroxydisulfate in 15 parts by weight water was added. The remaining monomer emulsion was metered in and polymerization was carried to completion. The total time of addition was 2 hours, the polymerization temperature and the temperature during the second heating period were in the range from 81° to 83° C. When the addition of monomers was terminated, 0.15 parts by weight ammonium peroxydisulfate in 5 parts by weight water was added, heating was continued for 1 hour and the reaction mixture was cooled. The pH was adjusted to 9.3 by means of 15 ml. of 25% NH$_3$. The solids content was about 50%.

EXAMPLE 4

The example was carried out in a manner analogous to Example 3, except that acetoacetic acid allyl ester was omitted in the polymerization.

EXAMPLE 5

A monomer emulsion was prepared from:
- 380 parts by weight water,
- 6 parts by weight ammonium-tri-tertiary butyl phenol polyglycol ether sulfate having about 8 ethylene oxide units,
- 12 parts by weight methacrylic acid
- 6 parts by weight acrylic acid
- 12 parts by weight acrylamide
- 450 parts by weight ethyl acrylate
- 150 parts by weight vinyl toluene
- 18 parts by weight acetoacetic acid allyl ester, by stirring in a rapid stirrer, until a stable emulsion was obtained.

In an apparatus as described in Example 1 a mixture consisting of:
- 390 parts by weight water,
- 3 parts by weight ammonium-tri-tertiary butyl phenol polyglycol ether sulfate having about 8 ethylene oxide units,
- 3 parts by weight nonyl phenol polyglycol ether having about 30 ethylene oxide units and,
- 60 parts by weight monomer emulsion, was heated to 81° C. and a solution of 0.45 parts by weight ammonium peroxydisulfate in 15 parts by weight water was added. The residual monomer emulsion was then metered in and polymerization was carried to completion. The total time of addition was 2 hours, the polymerization temperature and the temperature during the second heating period were in the range from 81° to 83° C. When the addition of monomers was terminated 0.15 parts by weight of ammonium peroxydisulfate in 5 parts by weight of water was added, heating was continued for 60 minutes and the reaction mixture was cooled. The pH was adjusted to 9.5 by means of 15 ml. of NH$_3$(25%). The solids content was about 45%.

EXAMPLE 6

The procedure was the same in Example 5, except that acetoacetic acid allyl ester was omitted in the polymerization.

EXAMPLE 7

In a 16 liter autoclave provided with an impeller stirrer there was introduced a liquor consisting of:
3090 g of demineralized water,
80.5 g of sodium dodecylbenzene sulfonate,
15 g of potassium persulfate, and
3 g of NaOH (solid).

The liquor and the whole apparatus were flushed with nitrogen. The other operations were also performed in a protective gas atmosphere.

From a receptacle a mixture consisting of:
1200 g of butadiene,
1560 g of styrene,
90 g of acetoacetic acid allyl ester was introduced by pumping into the autoclave.

The stirrer was set in motion (about 300 r.p.m.) and heating was started. The mixture was polymerized for two and a half hours at 70° C. (the internal pressure was about 10 bars) and a solution consisting of
40 g of sodium dodecylbenzene sulfonate in
750 g of demineralized water was added by pumping.

After another 2 hours of polymerization at 70° C. a solution of:
15 g of potassium persulfate in,
250 g of demineralized water was added and a mixture consisting of,
180 g of styrene and,
60 g of acrylic acid was metered in the course of about 15 minutes.

The after-reaction time was 3 hours (also at 70° C.). Thereafter the vessel was cooled, ventilated and the product was filtered.

The solids content was about 42%. The quantity of coagulate was low.

EXAMPLE 8

The procedure was the same as in Example 7, except that the quantity of styrene (1740 g) was replaced by vinyl toluene.

EXAMPLE 9

The procedure was the same as in Example 7, except that half of the quantity of styrene (780 g in the receptacle and 90 g in the second addition) was replaced by vinyl toluene.

EXAMPLE 10

A dispersion was prepared as described in Example 7 except that the acetoacetic acid allyl ester was omitted and the amount of water was reduced by 90 g to 3000 g.

EXAMPLE 11

A dispersion liquor consisting of:
709 parts water,
12 parts polyvinyl alcohol having a degree of hydrolysis of 88 mol %, and a viscosity of 18 cP at 20° C. in a 4% aqueous solution thereof,
0.9 part sodium vinylsulfonate,
1.1 parts sodium dodecylbenzene sulfonate,
15 parts nonylphenol polyglycol ether having about 30 ethylene oxide units,
0.72 part $NaH_2.PO_4.2H_2O$,
1.67 parts $Na_2HPO_4.12H_2O$,
1.5 parts ammonium peroxidisulfate and,
60 parts of a monomer mixture taken from a mixture of 300 parts vinylacetate, 150 parts 2-ethylhexyl acrylate, 150 parts pivalic acid vinyl ester and 18 parts acetoacetic acid allyl ester,
was heated while stirring in a 2 liter three-necked flask placed in a heating bath and equipped with stirrer, reflux condenser, dropping funnel and thermometer, whereby the polymerization was initiated. When the temperature had reached 90° C., addition of the remaining monomer was started.

Immediately after termination of the monomer addition a solution of 0.3 part ammonium peroxidisulfate in 15 parts water was added, heating of the polymerization mixture (70° C.) was continued for 2 hours while stirring and the batch was then slowly cooled.

The dispersion obtained had a solids content of about 47.5%.

EXAMPLE 12

The procedure of Example 11 was followed except that no acetoacetic acid allyl ester was used for the polymerization.

EXAMPLE 13

In an apparatus as described in Example 11 a dispersion liquor consisting of:
618 parts water,
18 parts oleyl polyglycol ether having about 25 ethylene oxide units,
0.2 part sodium dodecylbenzene sulfonate,
12 parts hydroxyethyl cellulose having an average degree of polymerization of about 400 (molecular weight about 100,000),
1.5 parts sodium acetate
2.5 parts ammonium peroxydisulfate and
63 parts of a monomer mixture taken from a mixture of:
450 parts vinyl acetate,
150 parts isononanoic acid vinyl ester and,
12 parts acetoacetic acid allyl ester,
was heated to 70° C. and the remaining monomer mixture (549 parts) was metered in within a period of 3 hours at this temperature. When the addition was terminated 0.5 part ammonium peroxydisulfate in 15 parts water were added and heating was continued for a further 2 hours. The dispersion had a solids content of about 50%.

EXAMPLE 14

The procedure of Example 13 was followed except that no acetoacetic acid allyl ester was used for the polymerization.

EXAMPLE 15

In an apparatus as described in Example 11 a dispersion liquor consisting of:
657 parts water,
18 parts nonylphenol polyglycol ether having about 30 ethylene glycol units,
12 parts polyvinyl alcohol having a degree of hydrolysis of 88 mol % and a viscosity of a 4% aqueous solution of 18 cP at 20° C.,
0.9 part sodium vinyl sulfonate,
1.5 parts sodium acetate,
2.5 parts ammonium peroxydisulfate,
48 parts vinyl acetate and,
12 parts versatic-10C-acid vinyl ester,
was heated to 70° C. and at said temperature there were added within a period of 3 hours a mixture of 432 parts vinyl acetate and 108 parts versatic-10C-acid vinyl ester and 9 parts acetoacetic acid allyl ester.

When the addition was terminated 0.5 part ammonium peroxydisulfate in 15 parts water was added and the dispersion was heated for a further 2 hours. The dispersion had a solids content of approximately 49%.

EXAMPLE 16

The procedure of Example 15 was followed except that no acetoacetic acid allyl ester was used for the polymerization.

EXAMPLE 17

In an apparatus as described in Example 11 a dispersion liquor consisting of:
622 parts water,
18 parts nonylphenol polyglycol ether having about 30 ethylene oxide units,
1.5 parts sodium acetate,
12 parts hydroxyethyl cellulose having an average degree of polymerization of about 400 (molecular weight about 100,000),
2.5 parts ammonium peroxydisulfate and,
60 parts of a monomer mixture prepared from 396 parts vinyl acetate,
150 parts versatic-10C-acid vinyl ester,
48 parts butyl acrylate,
18 parts acetoacetic acid allyl ester and,
6 parts crotonic acid,
was heated to 70° C. and at said temperature there was added, within 3 hours, the remaining monomer mixture (558 parts). When the addition was terminated 0.5 part ammonium peroxydisulfate in 15 parts water was added and the dispersion was heated for a further 2 hours. The dispersion had a solids content of about 50%.

EXAMPLE 18

The procedure of Example 17 was followed except that no acetoacetic acid allyl ester was used for the polymerization.

EXAMPLE 19

A dispersion liquor consisting of:
603 parts water
18 parts polyvinyl alcohol having a degree of hydrolysis of 88 mol %, and a viscosity of 18 cP at 20° C. in a 4% aqueous solution thereof,
0.9 part sodium vinylsulfonate,
6 parts sodium dodecylbenzene sulfonate,
0.72 part NaH$_2$PO$_4$.2H$_2$O,
1.67 parts Na$_2$HPO$_4$.12H$_2$O,
1.5 parts ammonium peroxydisulfate and,
60 parts vinyl acetate,
was heated while stirring in a 2 liter three-necked flask placed in a heating bath and equipped with stirrer, reflux condenser, dropping funnel and thermometer, whereby the polymerization was initiated. When the temperature had reached 70° C., 540 parts vinyl acetate and 18 parts acetoacetic acid allyl ester are metered in within 3 hours. Immediately after termination of the monomer addition, heating of the polymerization mixture (70° C.) was continued for 2 hours while stirring, and the batch was then slowly cooled.

EXAMPLE 20

The procedure of Example 19 was followed except that no acetoacetic acid allyl ester was added.

EXAMPLE 21

In an apparatus as described in Example 19 a dispersion liquor consisting of:
618 parts water,
18 parts nonylphenol polyglycol ether having about 30 ethylene glycol units,
1.5 parts sodium acetate,
12 parts hydroxyethyl cellulose having an average degree of polymerization of about 400 and a molecular weight of about 100,000,
2.5 parts ammonium peroxydisulfate,
10% (62 parts) of the monomer mixture consisting of 480 parts vinyl acetate, 120 parts dibutylmaleate and 18 parts acetoacetic acid allyl ester were heated to 70° C. and at said temperature there were added, within 3 hours, the remaining monomer mixture.

When the addition was terminatd 0.5 part ammonium peroxydisulfate in 15 parts water was added and the dispersion was heated for a further 2 hours. The dispersion had a solids content of about 50%.

EXAMPLE 22

The procedure of Example 21 was followed except that no acetoacetic acid allyl ester was added.

EXAMPLE 23

In an apparatus as described in Example 19 a dispersion liquor consisting of:
636 parts water,
18 parts nonylphenol polyglycol ether having about 30 ethylene oxide units,
12 parts polyvinyl alcohol having a degree of hydrolysis of 88 mol % and a viscosity of a 4% aqueous solution of 18 cP at 20° C.
0.9 part sodium vinyl sulfonate,
1.5 parts sodium acetate,
2.5 parts ammonium peroxydisulfate,
48 parts vinyl acetate,
12 parts vinyl ester of a versatic acid with 10 carbon atoms,
1.2 part acetoacetic acid allyl ester,
was heated to 70° C. and at said temperature there was added within 3 hours a mixture of 432 parts vinyl acetate, 108 parts versatic-10-C-acid vinyl ester and 18 parts acetoacetic acid allyl ester. When the addition was terminated, 0.5 part ammonium peroxydisulfate in 15 parts water was added and the dispersion was heated for a further 2 hours. The dispersion had a solids content of approximately 50%.

EXAMPLE 24

The procedure of Example 23 was followed except that no acetoacetic acid allyl ester was added.

EXAMPLE 25

A monomer emulsion of:
308 parts water,
6 parts ammonium tri-tert.butylphenol polyglycol ether sulfate having approximately 8 ethylene oxide units,
12 parts methacrylic acid,
6 parts acrylic acid,
300 parts 2-ethylhexyl acrylate,
300 parts methylmethacrylate and,
12 parts acetoacetic acid allyl ester,
was first prepared by rapidly stirring until a stable emulsion was obtained.

In an apparatus as described in Example 1 a mixture of
- 306 parts water,
- 3 parts ammonium tri-tert.butylphenol polyglycol ether as defined above and,
- 60 parts of the aforesaid monomer emulsion were heated to 81° C.

and a solution of 0.45 part ammonium peroxydisulfate in 15 parts water was added. Next, the remaining amount of the monomer emulsion was added in dosed quantities, and the polymerization was continued until it was complete. The total time of addition was 2 hours, the polymerization temperature and the temperature of the after-heating period was in the range of from 81° to 83° C. When the monomer addition was terminated 0.15 part ammonium peroxydisulfate in 5 parts water was added, the dispersion was heated for a further 60 minutes, and then it was cooled. The solids content was about 50%.

EXAMPLE 26

The procedure of Example 25 was followed except that no acetoacetic acid allyl ester was added.

EXAMPLE 27

A monomer emulsion having the following composition
- 310 parts water,
- 6 parts of the sodium salt of lauryl alcohol diglycol ether sulfate,
- 12 parts methacrylic acid,
- 6 parts acrylic acid,
- 300 parts butyl acrylate,
- 300 parts styrene and,
- 18 parts acetoacetic acid allyl ester was first prepared by rapidly stirring the components until the emulsion was stable.

In an apparatus as described in Example 1 a mixture of:
- 303 parts water,
- 3 parts of the sodium salt of lauryl alcohol diglycol ether sulfate and,
- 62 parts of the above monomer emulsion, was heated to 81° C. and a solution of 0.45 part ammonium peroxydisulfate in 15 parts water was added. Thereafter, the remaining monomer emulsion was added in dosed quantities, and the polymerization was continued until it was complete. The total period of dosed addition was 2 hours, the polymerization temperature and the after-heating temperature were in the range of from 81° to 83° C. When the monomer addition was terminated 0.15 part ammonium peroxydisulfate in 5 parts water were added, the dispersion was heated for a further 60 minutes, and cooled. The solids content was about 50%.

EXAMPLE 28

The procedure of Example 27 was followed except that no acetoacetic acid allyl ester was added.

To test for wet adhesion dispersion paints were prepared as follows:

Formulation I (1)
- 41.0 parts by weight water,
- 15.6 parts by weight of a 3% aqueous solution of Tylose ®H 20,
- 0.4 part by weight Calgon ®N (solid),
- 3.0 parts by weight dispersing agent PA 30,
- 1.0 part by weight ammonia of 25% strength,
- 2.0 parts by weight of preserving agent,
- 3.0 parts by weight of anti-foaming agent,
- 175 parts of titanium dioxide having a particle size of from 0.2 to 0.4 micron
- 10 parts 1,2-propylene glycol were dispersed and, (2) 710.0 parts by weight of dispersion of Examples 1–6 and 11–28 having a solids content of about 50% and 843 parts by weight of dispersion of Examples 7 to 10 having a solids content of 42% was used, to which 2.0 parts by weight of ammonia of 25% were added, if the pH was not above about 7.

(3) Thereafter a mixture of:
- 10 parts by weight butyl diglycol acetate,
- 27.0 parts by weight 1,2-propylene glycol was slowly added while stirring.

The liquid or soluble components indicated at (1), except for the 1,2-propylene glycol, were introduced into a vessel provided with a stirrer in the aforesaid order and the pigment was dissolved therein by means of a dissolver. 1,2-Propylene glycol was added thereafter. This pigment paste was prepared in a large amount so that for the blends with the dispersions to be tested equal conditions, for example, as regards the pigment dispersion, were ensured.

Formulation II

Formulation II differed from formulation I in that a different composition of the mixture of solvent added to the finished paint (processing step 3 of the preparation of paint). A mixture of 36 parts by weight of 1,2-propylene glycol, 13.5 parts by weight of butyl diglycol acetate and 20 parts by weight 2,2,4-trimethylpentanediol-1,3-monoisobutyrate-1 (tradename TEXANOL) was added.

Formulation III

Formulation III also differed from the aforesaid formulations by a different composition of the mixture of solvent added to the finished paint, i.e., a mixture of 51.1 parts by weight of 1,2-propylene glycol, 18.9 parts by weight of butyl diglycol acetate and 20 parts by weight of 2,2,4-trimethylpentanediol-1,3-monoisobutyrate (tradename TEXANOL) was added.

Formulation IV

Formulation IV differed from Formulation I in that it had a larger amount of organic solvent, that is, a mixture of 53 parts 1,2-propyleneglycol and 17 parts butyldiglycol acetate was added to the paint.

Formulation V

Formulation V differed from Formulations I and IV in that it had a still larger amount of organic solvents, that is, a mixture of 68.7 parts 1,2-propyleneglycol and 21.3 parts butyldiglycol acetate was added to the practically finished paint.

Formulation VI

Formulation VI differed from Formulation I in that a different solvent mixture was added to the practically finished paint (process step 3 of paint manufacture); that is, a mixture of 12.4 parts 1,2-propyleneglycol, 4.6 parts butyldiglycol acetate and 20 parts 2,2,4-trimethylpentanediol-1,3-monoisobutyrate-1 (tradename TEXANOL) was added to the paint.

For the manufacture of the individual paints a corresponding proportion of the pigment pastes was mixed according to the process of the above formulations, while slowly stirring, with the dispersions that were approximately one day old, whereupon the solvents mentioned at paragraph (3) were added. After complete formulation, the paints were passed through a sieve.

The resulting gloss paints were allowed to stand for one day and then spread on glass plates and steel sheets onto which a pigmented glossy air-drying alkyl resin enamel had previously been sprayed and which had been aged after drying for 24 hours at 100° C. A film applicator was used having a slit diameter of 200 microns. After a drying period of 24 hours the wet adhesion of the gloss paints was tested according to the two following methods:

(1) Abrasion Test

The glass plates with the dried coating of dispersion paint were inserted in a mechanical abrasion device as described, for example, in German Offenlegungsschrift No. 2,262,956 and similar to the Gardner Washability and Abrasion Machine, but having a moving length of approximately 1.20 m in a manner such that the applied films of dispersion paint were in a vertical position with respect to the moving direction of the brush. Due to the long moving distance about 15 paints could be simultaneously tested in one run. A brush with hog's bristles was used which, at the beginning of the test, had been wetted with distilled water. During the test the area on which the brush moved was also wetted with distilled water so that the brushed areas were permanently covered with a water film. With a poor wet adhesion the dispersion paint was brushed off the substrate after a few movements of the brush and torn at the boundary between wetted and dry film. The higher the number of movements of the brush, the better is the wet adhesion until the film is pushed aside. The dispersion paint has an optimum wet adhesion when in the wetted area the film is not damaged after 3,000 passages of the brush, one passage including a backward and forward stroke.

(2) Condensation Test

A rectangular thermostat was used one half of which was filled with water of 50° C. and in the gas space of which above the water level a fan was mounted. The upper opening was covered with the steel sheets with the coated surface in downward position so that the thermostat was closed. The thermostat was kept in a room maintained at 23° C. Owing to the temperature difference steam condensed on the lower surface of the sheets and acted on the coats of paint. After 15 minutes of action the sheets were removed and the coatings evaluated.

With an unsatisfactory wet adhesion blisters form between the film of dispersion paint and the alkyd resin lacquer and the film can be easily shifted aside, for example, with the finger tip. A film hving a good wet adhesion is still free of blisters after a period of 4 hours and cannot be pushed aside.

The test results for Examples 1 to 10 are listed in the following Table I.

TABLE I

| Example No. | Formulation No. | Abrasion test, number of double strokes of brush | Stability in condensation test |
|---|---|---|---|
| 1 | I | >5000 | >6 hrs. |

TABLE I-continued

| Example No. | Formulation No. | Abrasion test, number of double strokes of brush | Stability in condensation test |
|---|---|---|---|
| 2* | I | 110 | <15 min. |
| 3 | I | >5000 | >6 hrs. |
|  | II | >5000 | >6 hrs. |
|  | III | >5000 | >6 hrs. |
| 4* | I | 70 | <15 min. |
| 5 | I | >5000 | >6 hrs. |
| 6* | I | 50 | <15 min. |
| 7 | I | >3000 | >4 hrs. |
| 8 | I | >3000 | >4 hrs. |
| 9 | I | >3000 | >4 hrs. |
| 10* | I | 170 | <15 min. |

*Comparative Examples not in accordance with the present invention.

The test results for Examples 11 to 18 are listed below

TABLE II

| Example No. | Formulation No. | Abrasion test, number of double strokes of brush | Stability in condensation test |
|---|---|---|---|
| 11 | IV | >5000 | >6 hrs. |
|  | VI | >3000 | >6 hrs. |
| 12* | IV | 500 | 30 min. |
|  | VI | 450 | 25 min. |
| 13 | IV | >5000 | >6 hrs. |
|  | V | >5000 | >6 hrs. |
| 14* | IV | 250 | 15 min. |
| 15 | I | >5000 | >6 hrs. |
| 16* | I | 120 | 30 min. |
| 17 | I | >5000 | >6 hrs. |
| 18* | I | 500 | 2 hrs. |

*Comparative Examples not in accordance with this invention.

The test results for Examples 19 to 28 are set forth below.

TABLE III

| Example No. | Formulation No. | Abrasion test, number of double strokes of brush | Stability in condensation test |
|---|---|---|---|
| 19 | I | >3000 | 4 hrs. |
| 20* | I | 30 | 10 min. |
| 21 | I | >3000 | 4 hrs. |
| 22* | I | 120 | 15 min. |
| 23 | I | >3000 | 4 hrs. |
| 24* | I | 50 | 15 min. |
| 25 | I | >3000 | 4 hrs. |
| 26* | I | 70 | 15 min. |
| 27 | I | >3000 | 4 hrs. |
| 28* | I | 110 | 15 min. |

*Comparative Examples not in accordance with this invention.

EXAMPLE 29

A 2-liter-three-necked flask was placed in a heating bath, equipped with stirrer, reflux condenser, dropping funnel and thermometer and contained a dispersion liquor consisting of:
- 657 grams of water,
- 18 grams of nonylphenol polyglycol ether having about 30 ethylene units,
- 12 grams of polyvinyl alcohol having a degree of hydrolysis of 88 mol% the 4 weight percent aqueous solution of which has a viscosity of 18 mPa.s at 20° C.,
- 0.9 gram of sodium vinyl sulfonate,
- 1.5 grams of sodium acetate,
- 2.5 grams of ammonium peroxydisulfate,
- 48 grams of vinyl acetate, and
- 12 grams of versatic-10C-acid vinyl ester The dispersion liquor was heated to a temperature of 70° C., and at that temperature there was added, within a period of 3 hours, a mixture of 482 grams of vinyl acetate, 108 grams of versatic-10C-acid vinyl ester and 9 grams of acetoacetic acid allyl ester (=1.3 weight percent).

After termination of the addition a solution of 0.5 gram of ammonium peroxy-disulfate in 15 grams of water was added, and the dispersion was heated for another 2 hours. The dispersion obtained had a solids content of 49 weight percent and the amount of unreacted monomer was 0.9% by weight, calculated on the total weight of starting monomers.

EXAMPLES 30 TO 33

Experiment 29 was repeated using higher amounts of aceto-acetic acid allyl ester, as well as different amounts of water in order to achieve a theoretical solids content of about 50 weight percent. The higher the allyl ester amount was, the slower went the polymerization and the higher was the amount of unreacted monomers.

TABLE III

| Experiment No. | amount of allyl acetoacetate (g) | (weight %) | amount of water (g) | amount of unreacted monomers | solids content (weight %) |
|---|---|---|---|---|---|
| 30 | 48 | 8 | 696 | 2.4 | 48.1 |
| 31 | 60 | 10 | 708 | 4.3 | 46.2 |
| 32 | 72 | 12 | 720 | 11.9 | 38.6 |
| 33 | 84 | 14 | 732 | 16.8 | 33.3 |

EXAMPLE 34

Example 29 was repeated while omitting the acetoacetic acid allyl ester.

From the resulting dispersion a paint was prepared. For this purpose 175 grams of titanium dioxide having a particle size of from 0.2 to 0.4 um were mixed homogeneously, by means of a dissolver, in a mixture consisting of:

- 41.0 grams of water,
- 15.6 grams of an aqueous solution of ®Tylose H 20 (3 weight percent strength),
- 0.4 gram of ®Calgon N (solid),
- 3.0 grams of dispersing agent PA 30,
- 1.0 gram of ammonia (25 weight percent strength),
- 2.0 grams of preserving agent, and
- 3.0 grams of anti-foaming agent.

The mixture obtained was mixed with 236.7 grams of the above-mentioned dispersion to which 2.0 grams of ammonia (25 weight percent strength) had been added. A film made from the resulting paint was found to be, after drying, dull instead of glossy. The film was undamaged after 3,000 double strokes of brush in the wet adhesion test and no blisters were formed after 6 hours in the condensation test described above.

We claim:

1. A paint composition having improved wet adhesion consisting essentially of an aqueous dispersion of at least one polymer, from 3% to 20% by weight of said composition of a gloss-improving organic solvent selected from the group consisting of glycols, glycol ethers and glycol esters and a pigment in an amount of 7% to 30% by volume, the polymer of said aqueous dispersion being a copolymer of at least one olefinically unsaturated monomer and from 1 to 5% by weight, based on the weight of the copolymer, of an ethylenically unsaturated acetoacetic acid ester copolymerizable therewith.

2. A paint composition according to claim 1 wherein the copolymerizable acetoacetic acid ester is a vinyl acetoacetic acid ester, allyl acetoacetic acid ester or a diester of the formula $$R-CH=C(R)-C(O)-O-A-C(O)-CH_2-C(O)-CH_3$$

wherein R is H or $CH_3$ and A is $-(CH_2)_n-O-$ or $-(CH_2-CH_2)_m-O-$ n being an integer of from 1 to 4 and m an integer of from 1 to 3.

3. A paint composition according to claim 1 wherein the aqueous dispersion contains a mixture of polymers.

4. A paint composition according to claim 1 wherein the polymer of said aqueous dispersion is a copolymer of:

(A) from 5% to 50% by weight relative to the total amount of monomers, of at least one vinyl ester of saturated branched monocarboxylic acid having from 5 to 20 carbon atoms, the carboxyl groups of which are directly linked to a tertiary or quaternary carbon atom, (B) from 40% to 94.5% by weight of an ester selected from the group consisting of vinyl acetate, vinyl propionate, vinyl isobutyrate, and mixtures thereof, (C) from 0 to 30% by weight of other $\alpha,\beta$-unsaturated compounds copolymerizable with the foregoing monomers, and (D) from 1 to 5% by weight of an acetoacetic acid ester of the formula $$CH_3-C(O)-CH_2-C(O)-X-C(R)=C(R')H$$

wherein X is $-O-$, $-O-CH_2$ or $$-O-CH_2-CH_2-O-C(O)-$$

and R and R' are H or $CH_3$.

5. A paint composition according to claim 4 wherein the acetoacetic acid ester is the allyl ester.

6. A paint composition according to claim 1 wherein the polymer of said aqueous dispersion is a copolymer of:

(A) from 20 to 80% by weight, based on the total quantity of monomers, of a hardening monomer selected from methyl methacrylate, styrene, vinyl toluene and mixtures thereof, (B) from 20 to 80% by weight of a plasticizing monomer selected from the group consisting of acrylic acid esters carrying in the alcohol radical a linear or branched alkyl radical having from 2 to 8 carbon atoms and conjugated dienes having from 4 to 8 carbon atoms which may be halogenated, (C) from 0.1 to 5% by weight of a monomer selected from the group consisting of acrylic acid, methacrylic acid, acrylamide, methacrylamide and mixtures thereof and (D) from 1 to 5% by weight of an acetoacetic acid ester of the formula

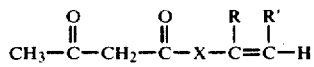

wherein R is H or CH$_3$, R' is H or CH$_3$, and X is —O—, —OCH$_2$ or

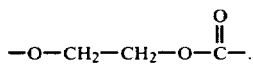

7. A paint composition according to claim 6 wherein the acetoacetic acid ester is the allyl ester.

8. A process for the preparation of a dispersion paint having improved wet adhesion which comprises copolymerizing in an aqueous reaction medium
 (A) 5 to 50% by weight, based on the total weight of monomers, of at least one vinyl ester of a saturated branched monocarboxylic acid having from 5 to 20 carbon atoms, the carboxyl groups of which are directly linked to a tertiary or quaternary carbon atom,
 (B) 40 to 94.5% by weight of an ester selected from the group consisting of vinyl acetate, vinyl propionate, vinyl isobutyrate and mixtures thereof,
 (C) 0 to 30% by weight of at least one other α-β-unsaturated compound copolymerizable with the above monomers, and
 (D) 1 to 5% by weight of an acetoacetic acid ester of the formula

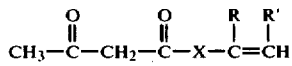

wherein X is —O—, —O—CH$_2$— or

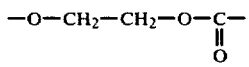

and R and R' each are H or CH$_3$, to form an aqueous plastics dispersion and mixing the dispersion with a gloss-improving solvent selected from the group consisting of glycols, glycol ethers and glycol esters and from 7 to 30% by volume, based on the volume of the dispersion point, of a pigment to form said paint.

9. A process for the preparation of a dispersion paint having improved wet adhesion which comprises copolymerizing
 (A) 20 to 80% by weight, based on the total weight of the monomers, of the hardening monomers methyl methacrylate, styrene and vinyl toluene or a mixture thereof,
 (B) 20 to 80% by weight, based on the total weight of the monomers, of plasticizing monomers selected from the group consisting of acrylic acid esters carrying in the alcohol radical a linear or branched alkyl radical having from 2 to 8 carbon atoms and conjugated dienes having from 4 to 8 carbon atoms which may be substituted by halogen,
 (C) 0.1 to 5% by weight of acrylic acid, methacrylic acid, acrylamide or methacrylamide, and
 (D) 1 to 5% by weight of an acetoacetic acid ester of the formula

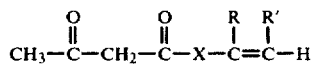

wherein R is H or CH$_3$, R' is H or CH$_3$, and X is —O—, —OCH$_2$ or

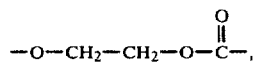

to form an aqueous plastics dispersion and mixing said dispersion with a gloss-improving solvent selected from the group consisting of glycols, glycol ethers and glycol esters and from 7 to 30% by volume, based on the volume of the dispersion paint, of a pigment to form said paint.

10. The paint composition, as claimed in claim 1, wherein the pigment is contained in an amount of 10 to 20% by volume.

11. The paint composition, as claimed in claim 1, wherein the solvent is contained in an amount of 5 to 15% by weight of the composition.

12. The process, as claimed in claim 8 or 9, wherein the pigment is contained in an amount of 10 to 20% by volume.

13. The process, as claimed in claim 8 or 9, wherein the solvent is contained in an amount of 5 to 15% by weight of the composition.

14. The paint composition, as claimed in claim 1, wherein the copolymer contains from 1 to 2.91% by weight of said acetoacetic acid ester.

15. The process, as claimed in claims 8 or 9, wherein the acetoacetic acid ester is contained in an amount of from 1 to 2.91% by weight.

16. The paint composition, as claimed in claim 1, wherein the copolymer contains from 1 to less than 5.0% by weight of said acetoacetic acid ester.

* * * * *